United States Patent Office 3,231,429
Patented Jan. 25, 1966

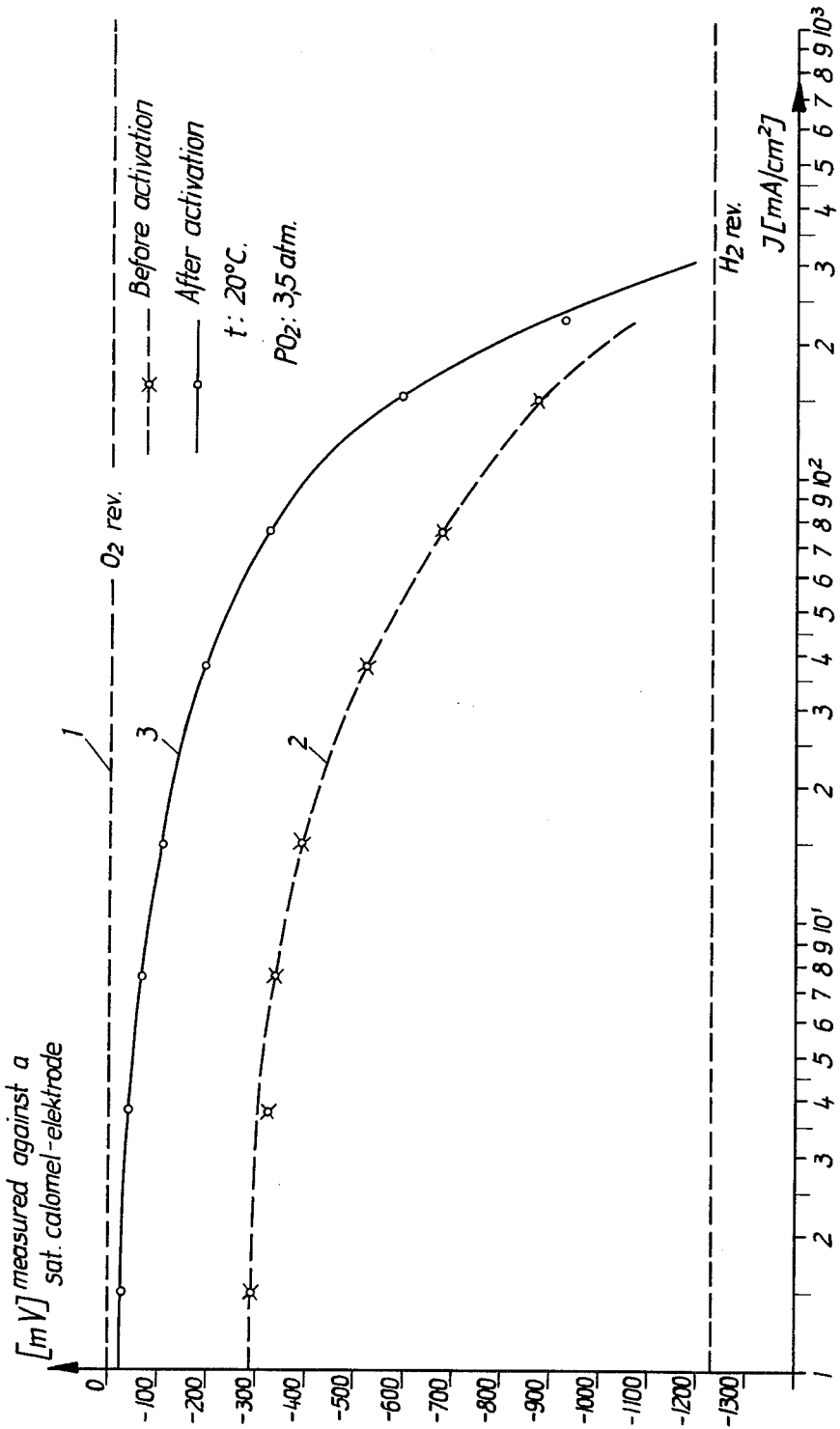

3,231,429
METHOD FOR ACTIVATING SILVER-CONTAINING ELECTRODES
Margarete Jung, Nieder-Eschbach, Taunus, Germany, and Hanns H. Kroeger, Schenectady, N.Y., assignors to Varta Aktiengesellschaft, Hagen, Westphalia, Germany, a corporation of Germany
Filed Feb. 20, 1962, Ser. No. 174,495
Claims priority, application Germany, Feb. 23, 1961, A 36,782
14 Claims. (Cl. 136—120)

The present invention relates to activated silver-containing electrodes and to a method of activating electrodes, which contain metallic silver, especially a catalytically active silver component.

As known, the active silver component is either precipitated in finely distributed form on a carbon electrode body, or silver powder or Raney silver is formed into a sintered electrode body, the major portion of the sintered body consisting of catalytically inactive material, for instance, carbonyl nickel.

However, such silver electrodes have the great disadvantage that their rest potential is considerably more negative than the reversible oxygen potential and decreases further when a load is connected thereto.

Furthermore, sintered Raney silver electrodes are highly corrosive and have little mechanical strength after activation of the electrode, i.e. after the catalytically inactive material has been leached therefrom in the conventional manner. In addition, the preparation and activation of these known silver oxidation electrodes is very time-consuming and, therefore, expensive.

It is the primary object of the present invention to avoid these disadvantages in the prior art silver electrode activation methods and to provide a simple and cheap electrode activation method.

This and other objects are accomplished in accordance with this invention by treating the electrode with a silver-activating solution containing an alkali metal cyanate, preferably potassium cyanate.

Water or an alkali metal hydroxide solution containing from about 0.1% to about 20% and preferably between about 0.5% and about 8%, by weight of the solution, of potassium cyanate has been found useful.

In accordance with a preferred embodiment of the invention, the favorable effects of the treatment are further enhanced by adding an oxidizing agent to the treating solution as described in our copending application "Method of Activating Silver-Containing Electrodes," Serial No. 174,496, filed February 20, 1962. This oxidizing agent may be hydrogen peroxide or a soluble peroxide, for instance, an alkali metal peroxide, percarbonate, perborate, persulfate or an organic compound with loosely bound oxygen, such as dibenzoic peroxide. Said oxidizing agent is added to the solution, for instance, in an amount from about 0.1% to about 10%, and preferably in an amount between about 0.2% and about 2.5%, by weight of the solution. The simplest way of oxidation is to bring air or gaseous oxygen into contact with the electrode.

The described electrode treatment may be effected, for instance, on a sintered electrode body produced in the following manner:

An intimate mixture of equal parts, by weight, of silver of a particle size of about 8 μ and of carbonyl nickel grade A was compressed in a mold under a pressure of 1.1 tons/sq.cm. of the electrode body surface to form an electrode body of 1.0 mm. thickness. The compressed body was sintered at a temperature of 750° C. in a hydrogen atmosphere for two minutes.

This electrode body was impregnated with a 10% solution of potassium cyanate in 6 N potassium hydroxide solution at room temperature and the body was maintained in the solution for about half an hour. Before the body was removed from the solution, oxygen gas was pressed therethrough.

Used as an oxygen electrode in a hydrogen fuel cell, the cell operated with a permanent load of 40 mA./sq.cm. for 5 months without any increase in the polarization of the electrode becoming noticeable.

It is possible to activate in the same manner other silver-containing electrodes as they are mentioned, for instance, in our copending application Serial No. 174,496.

The figure describes with the aid of a diagram the difference between an inactive sintered electrode and the same electrode after its activation at boiling temperature in a solution, containing 4 g. of sodium cyanate (NaOCN) and 5 g. of potassium persulfate per 100 cc. of water. The immersion time amounted to 4 minutes.

The horizontal line 1 relates to the reversible oxygen potential, measured opposite to a saturated calomel electrode. Curves 2 and 3 are drawn by plotting the values which were determined by testing an inactive electrode of sintered silver powder (curve 2) and the same electrode after activation as described hereinabove (curve 3). The measurements were carried out in half-element-connection opposite to a nickel sheet. The temperature was 20° C., the oxygen pressure was 3.5 atm.

At the start of the tests, adjustment of the final rest potential was first achieved. Thereafter, the silver electrode was negatively loaded, as shown in the diagram, and a reading of the potential, after its adjustment, was taken as soon as the new value did not change for 30 minutes. The curves 2 and 3 obtained in this manner show distinctly the increased capacity of the activated silver electrode treated as described hereinabove. It may be pointed out that the rest potential of the inactive silver electrode was finally reached after about 73 hours. In contrast thereto, the rest potential of the activated electrode was already reached after 3 minutes.

It is not yet clear to which fact the excellent activating power of the alkali metal cyanate solution is to be attributed inasmuch as the alkali metal cyanate does not form soluble complex compounds with silver.

It is not necessary to force a gaseous oxidizing agent under pressure through the activation solution. It is sufficient to dry the electrodes after they have been treated with the alkali metal cyanate solution in air or in an oxygen current.

The oxidizing agents are selected in such a manner that the material of which the electrodes are composed will not be attacked by the same.

The time required for activation is determined by a number of factors such as, for instance, by the kind of activating agent used, the solvent and oxidizing agent employed, the amount of activating agent and oxidizing agent added, the temperature at which activation is carried out, as well as the particle size of the silver to be activated. Optimum activation conditions can be predetermined, however, without difficulty by simple preliminary tests.

The activation process according to the present invention is particularly suitable for the treatment of silver electrodes to be used in fuel cells. It can be employed with considerable advantage for the activation of silver electrodes to be employed for other purposes, for instance, for use in primary and secondary cells.

While the invention has been described in conjunction with certain preferred embodiments, it will be clearly understood that many variations and modifications may occur to the skilled in the art without departing from the spirit and scope of the invention as defined in the appended claims.

We claim:

1. A process of catalytically activating a porous electrode comprising a conductive matrix and metallic silver which comprises treating the metallic silver-containing electrode with an aqueous solution containing between about 0.1% and about 20%, by weight, of an alkali metal cyanate.

2. A process of catalytically activating a porous electrode comprising a conductive matrix and metallic silver which comprises treating the metallic silver-containing electrode with an aqueous solution containing between about 0.1% and about 20%, by weight, of potassium cyanate.

3. A process of catalytically activating a porous electrode comprising a conductive matrix and metallic silver which comprises treating the metallic silver-containing electrode with an aqueous alkali metal hydroxide solution containing between about 0.1% and about 20%, by weight, of an alkali metal cyanate and between about 0.2 mole and about 10 moles of alkali metal hydroxide per liter.

4. A process of catalytically activating a porous electrode comprising a conductive matrix and metallic silver which comprises treating the metallic silver-containing electrode with an aqueous potassium hydroxide solution containing between about 0.1% and about 20%, by weight, of potassium cyanate and between about 0.2 mole and about 10 moles of potassium hydroxide per liter.

5. A process of catalytically activating a porous electrode comprising a conductive matrix and metallic silver which comprises treating the metallic silver-containing electrode with an aqueous potassium hydroxide solution containing between about 0.5% and about 8%, by weight, of potassium cyanate and between about 0.2 mole and about 10 moles of potassium hydroxide per liter.

6. A process of catalytically activating a porous electrode comprising a conductive matrix and metallic silver which comprises treating the metallic silver-containing electrode with an aqueous solution containing between about 0.1% and about 20%, by weight, of an alkali metal cyanate and contacting the electrode during said activating treatment with an oxygen-containing gas.

7. A process of catalytically activating a porous electrode comprising a conductive matrix and metallic silver which comprises treating the metallic silver-containing electrode with an aqueous solution containing between about 0.1% and about 20%, by weight, of an alkali metal cyanate and contacting the electrode after said activating treatment with an oxygen-containing gas.

8. A process of catalytically activating a porous electrode comprising a conductive matrix and metallic silver which comprises treating the metallic silver-containing electrode with an aqueous potassium hydroxide solution containing between about 0.1% and about 20%, by weight, of potassium cyanate and between about 0.2 mole and about 10 moles of potassium hydroxide per liter and contacting the electrode during said activating treatment with an oxygen-containing gas.

9. A process of catalytically activating a porous electrode comprising a conductive matrix and metallic silver which comprises treating the metallic silver-containing electrode with an aqueous potassium hydroxide solution containing between about 0.1% and about 20%, by weight, of potassium cyanate and between about 0.2 mole and about 10 moles of potassium hydroxide per liter and contacting the electrode after said activating treatment with an oxygen-containing gas.

10. A process of catalytically activating a porous electrode comprising a conductive matrix and metallic silver which comprises treating the metallic silver-containing electrode with an aqueous solution containing between about 0.1% and about 20% by weight, of an alkali metal cyanate and between about 0.1% and about 10%, by weight, of a peroxide compound soluble in said solution.

11. A process of catalytically activating a porous electrode comprising a conductive matrix and metallic silver which comprises treating the metallic silver-containing electrode with an aqueous solution containing between about 0.1% and about 20%, by weight, of an alkali metal cyanate and between about 0.1% and about 10%, by weight, of an oxidizing agent selected from the group consisting of hydrogen peroxide, an alkali metal percarbonate, an alkali metal perborate, and an alkali metal persulfate.

12. A process of catalytically activating a porous electrode comprising a conductive matrix and metallic silver which comprises treating the metallic silver-containing electrode with an aqueous solution containing between about 0.1% and about 20%, by weight, of an alkali metal cyanate and between about 0.1% and about 10%, by weight, of an alkali metal peroxide.

13. The process according to claim 10, wherein the soluble peroxide compound is an organic compound with loosely bound oxygen.

14. The process according to claim 10, wherein the soluble peroxide compound is dibenzoic peroxide.

References Cited by the Examiner

UNITED STATES PATENTS

| | | | |
|---|---|---|---|
| 1,425,576 | 8/1922 | Clancy | 252—476 |
| 2,187,882 | 1/1940 | Law | 252—476 |
| 2,857,447 | 10/1958 | Lindstrom | 136—20 |
| 2,887,496 | 5/1959 | Montagna | 252—476 |
| 2,927,886 | 3/1960 | Allen et al. | 136—34 |
| 2,944,946 | 7/1960 | Love et al. | 252—476 |

FOREIGN PATENTS

| | | |
|---|---|---|
| 218,093 | 12/1959 | Austria. |
| 568,242 | 12/1958 | Belgium. |

JOHN H. MACK, *Primary Examiner.*

JOHN R. SPECK, *Examiner.*